(12) United States Patent
Hatano

(10) Patent No.: US 7,942,483 B2
(45) Date of Patent: May 17, 2011

(54) BRAKE SYSTEM

(75) Inventor: Kunimichi Hatano, Saitama (JP)

(73) Assignee: Honda Motor Co., Ltd., Tokyo (JP)

(*) Notice: Subject to any disclaimer, the term of this patent is extended or adjusted under 35 U.S.C. 154(b) by 1042 days.

(21) Appl. No.: 11/645,126

(22) Filed: Dec. 22, 2006

(65) Prior Publication Data
US 2007/0182244 A1  Aug. 9, 2007

(30) Foreign Application Priority Data
Feb. 9, 2006  (JP) ................... 2006-032041

(51) Int. Cl.
*B10T 8/36* (2006.01)
*B10T 8/40* (2006.01)

(52) U.S. Cl. ............... 303/119.2; 303/119.3; 303/116.1; 303/DIG. 10

(58) Field of Classification Search ............... 303/119.2, 303/119.3, DIG. 10
See application file for complete search history.

(56) References Cited

U.S. PATENT DOCUMENTS

| | | | | |
|---|---|---|---|---|
| 4,932,728 | A | * | 6/1990 | Schenk et al. ............. 303/119.3 |
| 5,318,066 | A |   | 6/1994 | Burgdorf et al. |
| 6,126,248 | A | * | 10/2000 | Kawahata et al. ......... 303/114.1 |
| 6,322,165 | B1 | * | 11/2001 | Klein et al. ................ 303/119.2 |
| 6,520,206 | B2 |   | 2/2003 | Hotta et al. |
| 6,604,795 | B2 | * | 8/2003 | Isono et al. ...................... 303/11 |
| 2001/0038243 | A1 | * | 11/2001 | Isono .......................... 303/116.1 |
| 2005/0275286 | A1 |   | 12/2005 | Ohmori et al. |

FOREIGN PATENT DOCUMENTS

| | | |
|---|---|---|
| DE | 197 10 175 A1 | 9/1998 |
| DE | 600 25 879 T2 | 8/2006 |
| EP | 1 103 436 B1 | 2/2006 |
| JP | 5-503268 T | 6/1993 |
| JP | 2000-127805 | 5/2000 |
| JP | 2002-071044 A | 3/2002 |
| JP | 2005-349985 A | 12/2005 |

* cited by examiner

*Primary Examiner* — Bradley T King
*Assistant Examiner* — Mahbubur Rashid
(74) *Attorney, Agent, or Firm* — Carrier Blackman & Associates, P.C.; Joseph P. Carrier; William D. Blackman

(57) ABSTRACT

During normal operation of a braking force generating device, the wheels are braked by braking force generating device when a depressing force cut-off valve is closed by energizing its solenoid to cut off communication between a master cylinder and wheel cylinders. When an abnormality occurs, a master cylinder generates a brake fluid pressure upon a driver's braking operation, and supplies it to the wheel cylinders when the depressing force cut-off valve is opened by de-energizing its solenoid. When the depressing force cut-off valve is closed, such as during normal operation, since the depressing force cut-off valve functions as a one-way valve that is urged in a valve-closing direction due to a brake fluid pressure generated by the master cylinder, an electromagnetic force generated by the solenoid is smaller, thereby reducing the power consumption of the solenoid.

17 Claims, 3 Drawing Sheets

BRAKE SYSTEM

CROSS-REFERENCE TO RELATED APPLICATIONS

The present invention claims priority under 35 USC 119 based on Japanese patent application No. 2006-032041, filed on Feb. 9, 2006. The subject matter of this priority document is incorporated by reference herein.

BACKGROUND OF THE INVENTION

1. Field of the Invention

The present invention relates to a brake system in which, during normal operation, a wheel is braked by an electric braking force generation device; and when there is an abnormality in which the braking force generation device becomes inoperative, the wheel is braked with brake fluid pressure generated in a master cylinder upon a driver's braking operation.

2. Description of the Related Art

Japanese Patent Application Laid-open No. 2000-127805 discloses a so-called BBW (brake-by-wire) type brake system. In this system, a master cylinder generates brake fluid pressure upon depression of a brake pedal by a vehicle operator. During normal operation of the system, a power fluid pressure source for generating brake fluid pressure is operative, and a fluid pressure brake for braking a wheel is operated with brake fluid pressure generated by the power fluid pressure source when communication between the fluid pressure brake and the master cylinder is cut off by means of a master cylinder cut-off valve. When there is an abnormality in which the power fluid pressure source becomes inoperative, the master cylinder cut-off valve is opened to operate the fluid pressure brake with brake fluid pressure generated by the master cylinder. In addition, during the above-mentioned normal operation the brake fluid pressure generated by the master cylinder is absorbed by a stroke simulator to thus enable a stroke of the brake pedal.

In such a BBW type brake system, a depressing force cut-off valve (the master cylinder cut-off valve in the above publication) that provides or cuts off communication between the master cylinder and a wheel cylinder is a normally open solenoid valve. When there is an abnormality, such as a power source malfunction, and the solenoid is de-energized, the depressing force cut-off valve automatically opens, thus enabling the wheel cylinder to operate with a brake fluid pressure generated by the master cylinder. The solenoid of the depressing force cut-off valve is in an energized state during normal operation, which occupies most of the operation time apart from the above-mentioned abnormal operation. Thus, there is a demand for reduction in the power consumption of the solenoid.

The present invention has been accomplished under the above-mentioned circumstances, and it is an object thereof to reduce the power consumption of a solenoid of a depressing force cut-off valve in a BBW type brake system.

SUMMARY OF THE INVENTION

In order to achieve the above object, according to a first feature of the present invention, there is provided a brake system comprising: a master cylinder that generates a brake fluid pressure upon a driver's braking operation; a wheel cylinder for braking a wheel; a braking force generating device that electrically generates a braking force for braking the wheel in response to the driver's braking operation; and a depressing force cut-off valve that is provided in a fluid passage connecting together the master cylinder and the wheel cylinder, and that is closed by energizing a solenoid during normal operation of the braking force generating device and opened by de-energizing the solenoid when an abnormality occurs; wherein the depressing force cut-off valve has, in a valve-closed state, a function of a one-way valve that is urged in a valve-closing direction by virtue of the brake fluid pressure generated by the master cylinder.

With the first feature, during normal operation in which the braking force generating device is operative, the wheels are braked by the braking force generating device in a state in which the depressing force cut-off valve is closed to cut off communication between the master cylinder and wheel cylinder. When there is an abnormality in which the braking force generating device is inoperative, the master cylinder generates a brake fluid pressure upon the driver's braking operation and supplies it to the wheel cylinder in a state in which the depressing force cut-off valve is opened to provide communication between the master cylinder and wheel cylinder.

When the depressing force cut-off valve is closed by energizing its solenoid during normal operation, since the depressing force cut-off valve has a function of a one-way valve that is urged in a valve-closing direction due to a brake fluid pressure generated by the master cylinder, the electromagnetic force that should be generated by the solenoid can be smaller by a portion corresponding to the urging force due to the brake fluid pressure, and it is possible to reduce the power consumption of the solenoid by that portion.

According to a second feature of the present invention, in addition to the first feature, the brake system further comprises a first fluid pressure sensor that detects a brake fluid pressure between the master cylinder and the braking force generating device, and a second fluid pressure sensor that detects a brake fluid pressure between the braking force generating device and the wheel cylinder. During normal operation, the braking force generating device is controlled so that the brake fluid pressure detected by the second fluid pressure sensor changes in response to the brake fluid pressure detected by the first fluid pressure sensor.

With the second feature, during normal operation, the braking force generating device is controlled so that the brake fluid pressure, detected by the second fluid pressure sensor, between the braking force generating device and the wheel cylinder changes in response to the brake fluid pressure, detected by the first fluid pressure sensor, between the master cylinder and the braking force generating device. Therefore, it is possible to generate a braking force in the wheel cylinder in accordance with a braking operation by the driver.

According to a third feature of the present invention, in addition to the first feature, the master cylinder communicates with a stroke simulator via a reaction force permitting valve that opens during normal operation and closes when an abnormality occurs.

With the third feature, since the master cylinder communicates with the stroke simulator via the reaction force permitting valve, which opens during normal operation and closes when an abnormality occurs, it is possible to obtain a good pedal feeling during normal operation by virtue of the stroke simulator absorbing the brake fluid pressure generated by the master cylinder. In addition, when an abnormality occurs, it is possible to effectively transmit the brake fluid pressure generated by the master cylinder to the wheel cylinder by cutting off communication with the stroke simulator.

According to a fourth feature of the present invention, in addition to the first feature, the fluid passage between the depressing force cut-off valve and the braking force generating device communicates with a reservoir via an atmosphere valve that opens during normal operation and closes when an abnormality occurs.

With the fourth feature, since the fluid passage between the depressing force cut-off valve and the braking force generating device communicates with the reservoir via the atmosphere valve, which opens during normal operation and closes when the abnormality occurs. Therefore, an insufficient amount of brake fluid is supplied from the reservoir to the wheel cylinder during normal operation to prevent dragging, and the brake fluid pressure generated by the master cylinder is prevented from escaping to the reservoir when an abnormality occurs.

The above-mentioned object, other objects, characteristics, and advantages of the present invention will become apparent from a preferred embodiment that will be described in detail below by reference to the attached drawings.

DESCRIPTION OF THE PREFERRED EMBODIMENT

Figure 1:
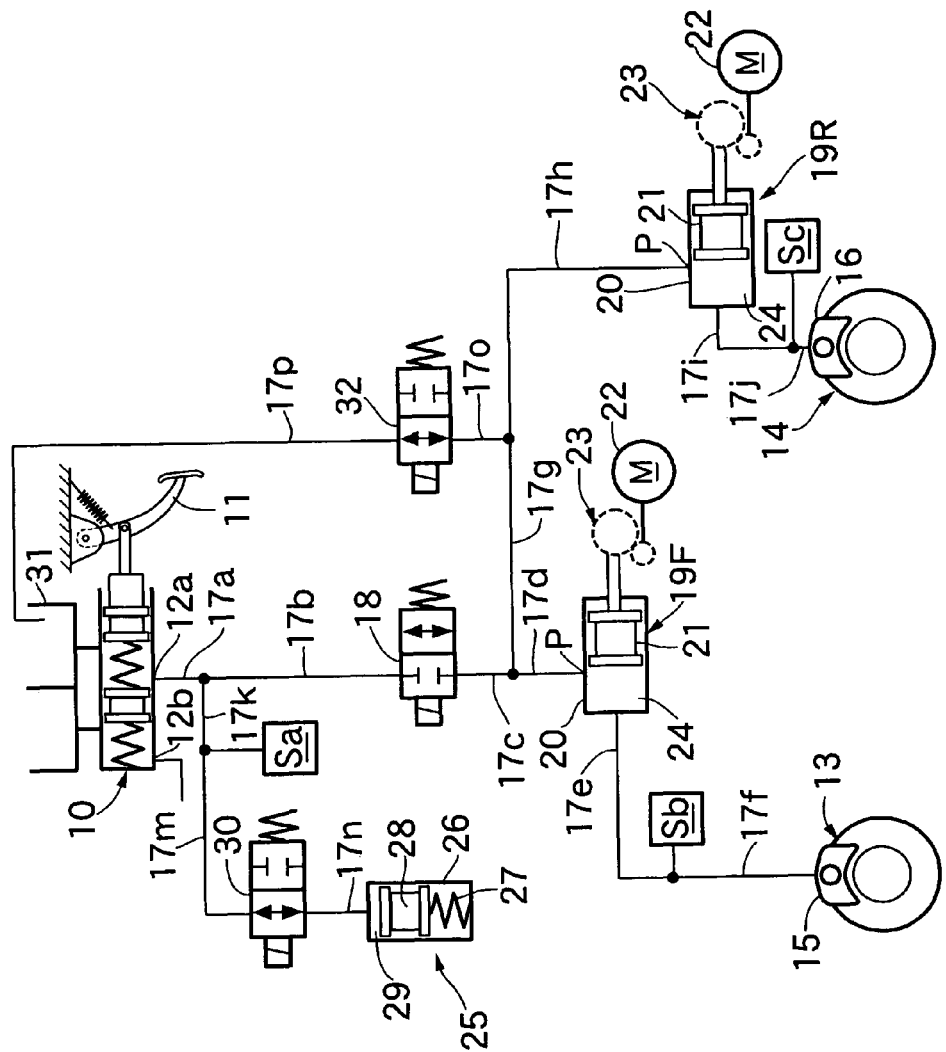
FIG. 1 is a fluid pressure schematic diagram of a vehicular brake system according to one embodiment of the present invention during normal operation.

As shown in FIG. 1, a tandem master cylinder 10 includes first and second output ports 12a and 12b for outputting a brake fluid pressure in accordance with a depressing force with which a driver depresses a brake pedal 11. The first output port 12a is connected to, for example, disk brake systems 13 and 14 of a front left wheel and a rear right wheel. The second output port 12b being connected to, for example, disk brake systems of a front right wheel and a rear left wheel. FIG. 1 shows only one brake circuit connected to the first output port 12a, and the other brake circuit connected to the second output port 12b is not illustrated, but the structures of the one and other brake circuits are substantially the same. The one brake circuit connected to the first output port 12a is explained below.

The first output port 12a of the master cylinder 10 and a wheel cylinder 15 of the front wheel disk brake system 13 are connected via fluid passages 17a to 17f. Fluid passages 17g to 17j branching from a point between the fluid passages 17c and 17d are connected to a wheel cylinder 16 of the rear wheel disk brake system 14.

A depressing force cut-off valve 18, which is a normally open solenoid valve, is disposed between the fluid passages 17b and 17c. A front wheel braking force generating device 19F is disposed between the fluid passages 17d and 17e. The braking force generating device 19F includes a cylinder 20 disposed between the fluid passages 17d and 17e. A piston 21 is slidably fitted in the cylinder 20 and driven by an electrically operated motor 22 via a reduction mechanism 23 so as to generate a brake fluid pressure in a fluid chamber 24 formed on a front face of the piston 21.

Similarly, a rear wheel braking force generating device 19R is disposed between the fluid passages 17h and 17i. The braking force generating device 19R includes a cylinder 20 disposed between the fluid passages 17h and 17i. A piston 21 is slidably fitted in the cylinder 20 and driven by an electrically operated motor 22 via a reduction mechanism 23 so as to generate a brake fluid pressure in a fluid chamber 24 formed on a front face of the piston 21.

A stroke simulator 25 is connected to the downstream end of fluid passages 17k to 17n branching from a point between the fluid passages 17a and 17b. The stroke simulator 25 has a piston 28 slidably fitted in a cylinder 26, the piston 28 being biased by a spring 27. A fluid chamber 29 formed on the side of the piston 28 opposite to the spring 27 communicates with the fluid passage 17n. A reaction force permitting valve 30, which is a normally closed solenoid valve, is disposed between the fluid passages 17m and 17n. Fluid passages 17o and 17p branch from a point between the fluid passages 17g and 17h and communicate with a reservoir 31 of the master cylinder 10. An atmosphere valve 32, which is a normally closed solenoid valve, is disposed between the fluid passages 17o and 17p.

A BBW electronic control unit (not illustrated) controls the operation of the depressing force cut-off valve 18, the reaction force permitting valve 30, the atmosphere valve 32, and the electrically operated motors 22 of the braking force generating device 19F and 19R. Connected to the BBW electronic control unit are a fluid pressure sensor Sa which detects a brake fluid pressure generated by the master cylinder 10, a fluid pressure sensor Sb which detects a brake fluid pressure transmitted to the front wheel disk brake system 13, and a fluid pressure sensor Sc which detects a brake fluid pressure transmitted to the rear wheel disk brake system 14.

Figure 3:
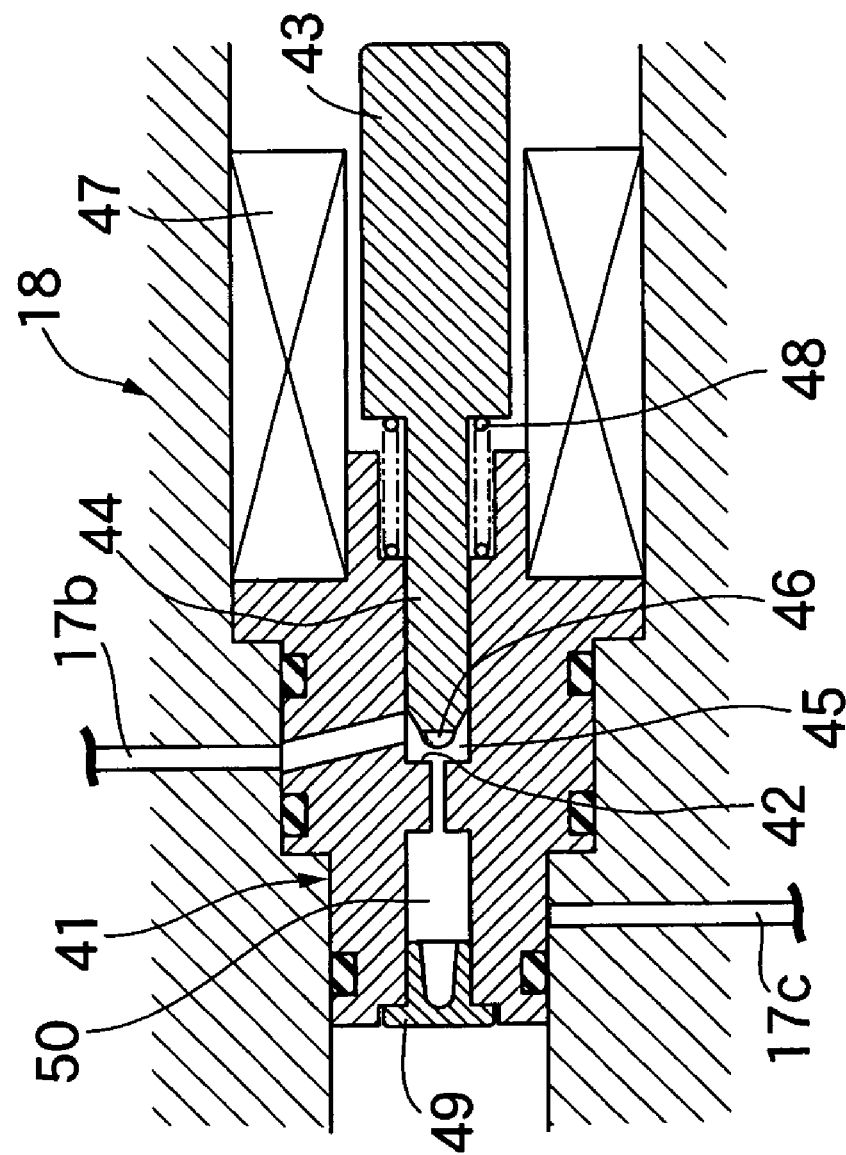
FIG. 3 is an enlarged sectional view of a depressing force cut-off valve.

As shown in FIG. 3, the depressing force cut-off valve 18 includes a substantially cylindrical valve housing 41, and a valve seat 42 is formed in the center of the valve housing 41. A rod 44 extending from an armature 43 is slidably fitted into the upstream side of the valve seat 42. A front chamber 45 is defined between the valve seat 42 and the rod 44, the front chamber 45 communicating with the master cylinder 10 via the fluid passages 17b and 17a. A valve body 46, which can be seated on the valve seat 42, is provided at the extremity of the rod 44. A solenoid 47 is provided at the end of the valve housing 41 so as to cover the outer periphery of the armature 43. The armature 43 is urged by a valve spring 48 in a direction in which the valve body 46 moves away from the valve seat 42. The downstream side of the valve seat 42 is blocked by a cap 49. A rear chamber 50 is defined between the valve seat 42 and the cap 49, the rear chamber 50 communicating with the braking force generating device 19F and 19R via the fluid passages 17c, 17d, 17g, and 17h.

The depressing force cut-off valve 18 having the above-mentioned structure is a normally open solenoid valve: it opens when the solenoid 47 is de-energized and the valve body 46 moves away from the valve seat 42 by virtue of the resilient force of the valve spring 48, and it closes when the solenoid 47 is energized so as to attract the armature 43, thereby seating the valve body 46 on the valve seat 42 against the resilient force of the valve spring 48.

The operation of the embodiment of the present invention having the above-mentioned arrangement is now explained.

During normal operation shown in FIG. 1, the solenoids of the depressing force cut-off valve 18, the reaction force permitting valve 30, and the atmosphere valve 32 are energized by commands from the BBW electronic control unit (not illustrated). As a result, the depressing force cut-off valve 18 closes so as to cut off communication between the master cylinder 10 and the disk brake systems 13 and 14; the reaction force permitting valve 30 opens so as to provide communication between the master cylinder 10 and the stroke simulator 25; and the atmosphere valve 32 opens. In this state, when the driver depresses the brake pedal 11 so as to make the master cylinder 10 generate a brake fluid pressure, the fluid pressure sensor Sa detects a fluid pressure of the fluid passage 17k which is blocked by the depressing force cut-off valve 18. The BBW electronic control unit makes the front wheel and rear wheel braking force generating device 19F and 19R operate so as to generate a fluid pressure in the fluid passages 17f and 17j same as the brake fluid pressure detected by the fluid pressure sensor Sa.

As a result, the driving force of the electrically operated motor 22 of the front wheel braking force generating device 19F is transmitted to the piston 21 via the reduction mechanism 23, and a brake fluid pressure generated in the fluid chamber 24 of the cylinder 20 is transmitted to the wheel cylinder 15 of the disk brake system 13 via the fluid passages 17e and 17f, thereby braking the front wheels. In this process, the brake fluid pressure of the fluid passage 17f is detected by the fluid pressure sensor Sb, and the operation of the electrically operated motor 22 is feedback-controlled so that this brake fluid pressure coincides with the brake fluid pressure detected by the fluid pressure sensor Sa of the fluid passage 17k.

Similarly, the driving force of the electrically operated motor 22 of the rear wheel braking force generating device 19R is transmitted to the piston 21 via the reduction mechanism 23, and a brake fluid pressure generated in the fluid chamber 24 of the cylinder 20 is transmitted to the wheel cylinder 16 of the disk brake system 14 via the fluid passages 17i and 17j, thereby braking the rear wheel. In this process, the brake fluid pressure of the fluid passage 17j is detected by the fluid pressure sensor Sc, and the operation of the electrically operated motor 22 is feedback-controlled so that this brake fluid pressure coincides with the brake fluid pressure detected by the fluid pressure sensor Sa of the fluid passage 17k.

When the piston 21 within the cylinder 20 is moved slightly forward by the electrically operated motor 22, communication between the fluid chamber 24 and the fluid passage 17d (or the fluid passage 17h) is cut off, eliminating a possibility that the brake fluid pressure generated by the cylinder 20 escapes to the reservoir 31 via the atmosphere valve 32 provided between the fluid passages 17o and 17p.

During the above-mentioned normal operation, unless an abnormal state such as a power source malfunction occurs, the depressing force cut-off valve 18 is held in a closed state. Therefore, there are conventional problems that, if the brake pads of the disk brake systems 13 and 14 are worn to increase the volume of the fluid passages 17e and 17f or the fluid passages 17i and 17j between the cylinders 20 and the disk brake systems 13 and 14, an amount of brake fluid corresponding to the increase cannot be replenished from the reservoir 31, and moreover drag of the wheel cylinders 15 and 16 cannot be reduced.

However, when the pistons 21 within the cylinders 20 retreat, the fluid chambers 24 communicate with the reservoir 31 via the opened atmosphere valve 32, whereby a shortfall in the brake fluid due to the wear of the brake pads of the disk brake systems 13 and 14 can be replenished from the reservoir 31, and drag of the wheel cylinders 15 and 16 when the braking force is released can be reduced.

Further, when the driver depresses the brake pedal 11 during normal operation and the master cylinder 10 generates a brake fluid pressure, the brake fluid pressure is transmitted to the fluid chamber 29 of the stroke simulator 25, so that the piston 28 moves against the resilient force of the spring 27, thereby generating a reaction force against the depression of the brake pedal 11. This arrangement provides an operational feeling similar to that provided when the disk brake systems 13 and 14 are operated by a driver's depressing force, although the disk brake systems 13 and 14 are actually operated by the driving force of the electrically operated motors 22.

Figure 2:
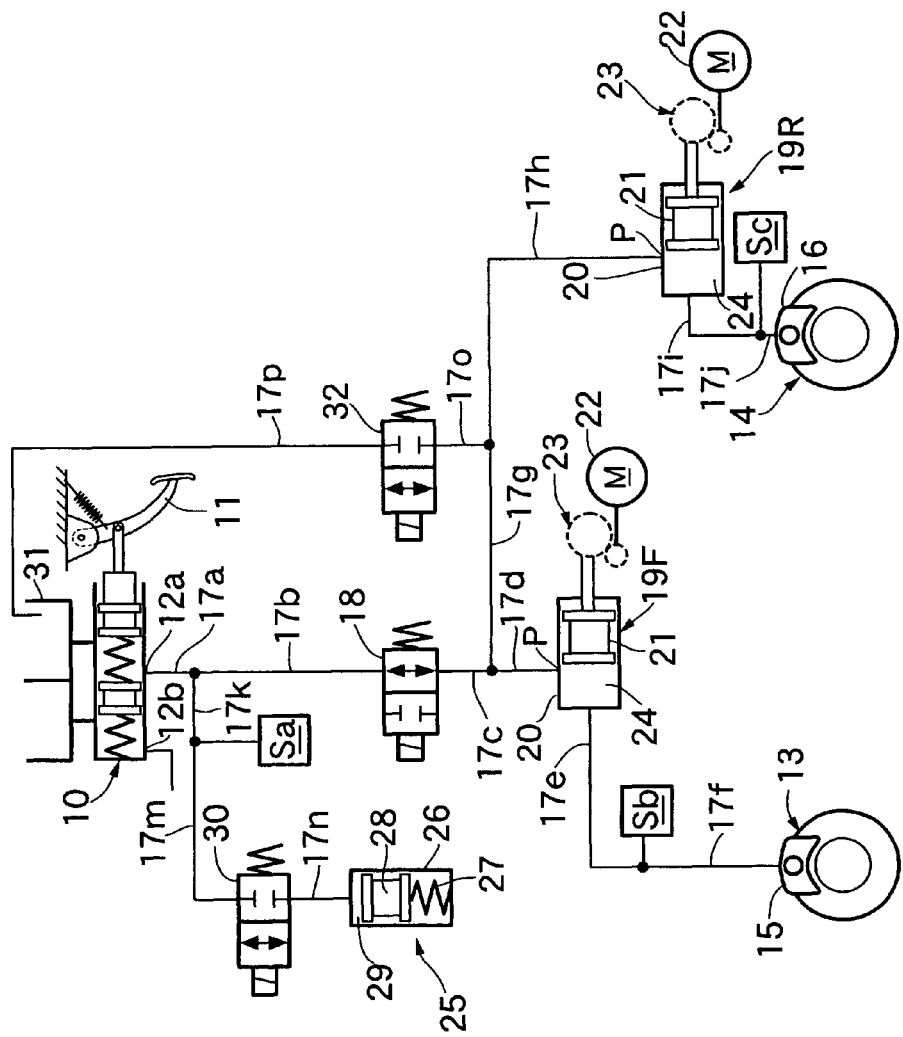
FIG. 2 is a fluid pressure schematic diagram corresponding to FIG. 1 when an abnormality occurs.

When there is an abnormality such as a power source malfunction caused by detachment of a battery, etc., the depressing force cut-off valve 18 opens as shown in FIG. 2 to provide communication between the master cylinder 10 and the disk brake systems 13 and 14; the reaction force permitting valve 30 closes so as to cut off communication between the master cylinder 10 and the stroke simulator 25; and the atmosphere valve 32 closes so as to cut off communication between the master cylinder 10 and the reservoir 31. As a result, the brake fluid pressure generated in the master cylinder 10 by the driver depressing the brake pedal 11 is transmitted to the wheel cylinder 15 of the front wheel disk brake system 13 via the opened depressing force cut-off valve 18 and the braking force generating device 19F. Brake fluid pressure is also transmitted to the wheel cylinder 16 of the rear wheel disk brake system 14 via the opened depressing force cut-off valve 18 and the braking force generating device 19R, thereby braking the front wheels and the rear wheels.

At the same time, communication between the stroke simulator 25 and the master cylinder 10 is cut off by the reaction force permitting valve 30 being closed, the stroke simulator 25 stops functioning. As a result, it is possible to prevent the driver from suffering a disagreeable sensation due to the unnecessarily increased stroke of the brake pedal 11, and moreover the brake fluid pressure generated by the master cylinder 10 is transmitted to the wheel cylinders 15 and 16 without being absorbed by the stroke simulator 25, thus generating a braking force with a high responsiveness.

Therefore, even if a power source malfunction occurs so that the depressing force cut-off valve 18, the reaction force permitting valve 30, the atmosphere valve 32, and the braking force generating device 19F and 19R become inoperative, the wheel cylinders 15 and 17 of the front wheel and the rear wheel can be operated without any problem by device of the brake fluid pressure generated in the master cylinder 10 by the driver depressing the brake pedal 11, thereby braking the front wheel and the rear wheel when an abnormality occurs to more safely stop the vehicle.

The solenoid 47 of the depressing force cut-off valve 18 is energized during normal operation excluding a time when an abnormality occurs, and the armature 43 is attracted against the resilient force of the valve spring 48, so that the valve body 46 provided on the rod 44 integral with the armature 43 is seated on the valve seat 42, thereby cutting off communication between the front chamber 45 and the rear chamber 50.

In such a state in which the depressing force cut-off valve 18 is closed, even if the braking force generating device 19F and 19R are operated to generate a brake fluid pressure, ports P (see FIG. 1 and FIG. 2) communicating with the fluid passages 17d and 17h are closed by the pistons 21 of the braking force generating device 19F and 19R moving only slightly forward, so that the rear chamber 50 of the depressing force cut-off valve 18 is always maintained at a low pressure that is close to atmospheric pressure. On the other hand, when the brake pedal 11 is not depressed, atmospheric pressure acts on the front chamber 45 of the depressing force cut-off valve 18, but when the brake pedal 11 is depressed, the brake fluid pressure generated by the master cylinder 10 acts on the front chamber 45.

Therefore, when the brake pedal 11 is not depressed, both the front chamber 45 and the rear chamber 50 are at atmospheric pressure, and thus the solenoid 47 of the depressing force cut-off valve 18 only needs to generate a small amount of electromagnetic force in order to overcome the resilient force of the valve spring 48, thereby reducing the power consumption of the depressing force cut-off valve 18. Further, when the brake pedal 11 is depressed, the rear chamber 50 is at atmospheric pressure whereas the brake fluid pressure generated by the master cylinder 10 acts on the front chamber 45, the valve body 46 can be seated on the valve seat 42 although the solenoid 47 of the depressing force cut-off valve 18 generates no or substantially no electromagnetic force. Accordingly, it will be seen that under certain conditions, when the brake pedal is depressed, the valve body 46 may be moved to contact and form a seal with the valve seat 42, with the solenoid 47 in a partially energized state. This is because, when the rear chamber 50 has a low pressure and the front chamber 45 has a high pressure, the valve body 46 and the valve seat 42 function as a one-way valve, and the valve body 46 is seated on the valve seat 42 by virtue of the difference in pressure between the rear chamber 50 and the front chamber 45.

Supposing that the depressing force cut-off valve 18 were arranged in the opposite direction, the front chamber 45 were connected to the braking force generating device 19F and 19R, and the rear chamber 50 were connected to the master cylinder 10, it would be necessary to generate in the solenoid 47 an electromagnetic force that can overcome the difference in pressure between the rear chamber 50 and the front chamber 45, that is, the brake fluid pressure generated by the master cylinder 10, in order to maintain the depressing force cut-off valve 18 in a valve-closed state when the master cylinder 10 is generating a brake fluid pressure, resulting in a large increase in power consumption.

Although an embodiment of the present invention has been described above, the present invention can be modified in a variety of ways without departing from the subject matter of the present invention.

For example, in the described embodiment, the wheel cylinders 15 and 16 are operated with a brake fluid pressure generated by the braking force generating device 19F and 19R which are operated by the electrically operated motors 22, but in an alternate configuration, the wheel cylinders 15 and 16 may be directly operated mechanically by the electrically operated motors 22 without employing a brake fluid pressure.

Further, in the described embodiment, the depressing force cut-off valve 18 is always closed during normal operation, but even during normal operation, if, in an alternate configuration, the depressing force cut-off valve 18 is opened when the driver is not depressing the brake pedal 11 and is closed when the driver is depressing the brake pedal 11, it is possible to further reduce the power consumption of the solenoid 47.

What is claimed is:

1. A brake system comprising:
   a master cylinder that generates a brake fluid pressure upon a driver's braking operation;
   a wheel cylinder for braking a wheel;
   a fluid passage that connects the master cylinder to the wheel cylinder;
   a braking force generating device that electrically generates a braking force for braking the wheel in response to the driver's braking operation; and
   a depressing force cut-off valve provided in the fluid passage that is closed by energizing a solenoid during normal operation of the braking force generating device, and opened by de-energizing the solenoid when an abnormality occurs, said depressing force cut-off valve operable to isolate the master cylinder from the wheel cylinder when said solenoid is energized;
   wherein the system is configured so that when brake fluid pressure is applied to the depressing force cut-off valve by the master cylinder, the depressing force cut-off valve is operable as a one-way valve that is urged in a valve-closing direction by the brake fluid pressure from the master cylinder.

2. The brake system according to claim 1, further comprising
   a first fluid pressure sensor that detects a brake fluid pressure between the master cylinder and the braking force generating device, and
   a second fluid pressure sensor that detects a brake fluid pressure between the braking force generating device and the wheel cylinder,
   wherein during normal operation, the braking force generating device is controlled so that the brake fluid pressure detected by the second fluid pressure sensor changes in response to the brake fluid pressure detected by the first fluid pressure sensor.

3. The brake system according to claim 1, wherein the master cylinder communicates with a stroke simulator via a reaction force permitting valve that opens during normal operation and closes when the abnormality occurs.

4. The brake system according to claim 1, wherein the fluid passage between the depressing force cut-off valve and the braking force generating device communicates with a reservoir via an atmosphere valve that opens during normal operation and closes when the abnormality occurs.

5. The brake system according to claim 1, wherein the depressing force cut-off valve comprises:
   the solenoid;
   a hollow cylindrical housing;
   a valve body disposed within an interior space of the housing, the valve body slidably positioned within the housing by means of the solenoid;
   a front chamber formed within the housing and configured to communicate with the master cylinder;
   a rear chamber formed within the housing and configured to communicate with the braking force generating device; and
   a valve seat disposed between the front chamber and the rear chamber, the valve seat configured to permit communication between the front and rear chambers when the solenoid is de-energized and the valve body is disposed at a location spaced apart from the valve seat, and configured to prevent communication between the front and rear chambers when the solenoid is energized and the valve body is in contact with the valve seat;
   wherein the rear chamber is always maintained at a low pressure that is close to atmospheric pressure while the depressing force cut-off valve is closed, and wherein the front chamber is maintained at a pressure which is atmospheric or greater.

6. The brake system according to claim 1, wherein the brake system further comprises a reaction force permitting valve and an atmosphere valve, the reaction force permitting valve and atmosphere valve being open during normal operation, and wherein
   the master cylinder communicates with a stroke simulator via the reaction force permitting valve, and
   the fluid passage between the depressing force cut-off valve and the braking force generating device communicates with a reservoir via the atmosphere valve,
   such that when there is an abnormality, the depressing force cut-off valve opens to provide communication between the master cylinder and the wheel cylinder, the reaction force permitting valve closes so as to cut off communication between the master cylinder and the stroke simulator, and the atmosphere valve closes so as to cut off communication between the master cylinder and the reservoir.

7. The brake system according to claim 1, wherein the brake force generating device comprises:
a cylinder disposed in the fluid passage between the depressing force cut-off valve and the wheel cylinder;
a piston slidably fitted within the cylinder; and
an electrically operated motor configured to drive the piston within the cylinder so as to generate a brake fluid pressure in a fluid chamber formed between the piston and a front end of the cylinder.

8. The brake system according to claim 7, further comprising:
a first fluid pressure sensor that detects a brake fluid pressure between the master cylinder and the braking force generating device, and
a second fluid pressure sensor that detects a brake fluid pressure between the braking force generating device and the wheel cylinder,
wherein during normal operation, the electrically operated motor is controlled so that the brake fluid pressure detected by the second fluid pressure sensor changes in response to the brake fluid pressure detected by the first fluid pressure sensor.

9. The brake system according to claim 7, wherein in response to the driver's braking operation, the electrically operated motor drives the piston toward the front end of the cylinder such that pressure is increased in the fluid chamber and such that communication between the fluid chamber and a master cylinder side of the fluid passage is cut off.

10. A brake system comprising:
a master cylinder that generates a brake fluid pressure upon a driver's braking operation;
a wheel cylinder for braking a wheel;
a fluid passage that connects the master cylinder to the wheel cylinder;
a braking force generating device that electrically generates a braking force for braking the wheel in response to the driver's braking operation; and
a depressing force cut-off valve;
wherein the depressing force cut-off valve is configured with a solenoid, a hollow cylindrical housing, a valve body disposed within an interior space of the hollow cylindrical housing, a front chamber formed within the hollow cylindrical housing configured to communicate with the master cylinder, a rear chamber formed within the hollow cylindrical housing configured to communicate with the braking force generating device, and a valve seat disposed between the front chamber and the rear chamber,
wherein the valve seat is configured to permit communication between the front and rear chambers when the solenoid is de-energized and the valve body is disposed at a location spaced apart from the valve seat, and configured to prevent communication between the front and rear chambers when the solenoid is energized and the valve body is in contact with the valve seat;
wherein the valve body is slidably positioned within the housing by means of the solenoid; and
wherein the rear chamber is always maintained at a low pressure that is close to atmospheric pressure while the depressing force cut-off valve is closed, and the front chamber is maintained at a pressure which is atmospheric or greater.

11. The brake system according to claim 10, wherein the depressing force cut-off valve is provided in the fluid passage that is closed by energizing a solenoid during normal operation of the braking force generating device, and opened by de-energizing the solenoid when an abnormality with the braking force generating device occurs.

12. The brake system according to claim 10, further comprising:
a first fluid pressure sensor that detects a brake fluid pressure between the master cylinder and the braking force generating device, and
a second fluid pressure sensor that detects a brake fluid pressure between the braking force generating device and the wheel cylinder,
wherein during normal operation, the braking force generating device is controlled so that the brake fluid pressure detected by the second fluid pressure sensor changes in response to the brake fluid pressure detected by the first fluid pressure sensor.

13. The brake system according to claim 10, wherein the master cylinder communicates with a stroke simulator via a reaction force permitting valve that opens during normal operation and closes when the abnormality occurs.

14. The brake system according to claim 10, wherein the fluid passage between the depressing force cut-off valve and the braking force generating device communicates with a reservoir via an atmosphere valve that opens during normal operation and closes when the abnormality occurs.

15. The brake system according to claim 10, wherein the brake system further comprises a reaction force permitting valve and an atmosphere valve, the reaction force permitting valve and atmosphere valve being open during normal operation, and wherein
the master cylinder communicates with a stroke simulator via the reaction force permitting valve, and
the fluid passage between the depressing force cut-off valve and the braking force generating device communicates with a reservoir via the atmosphere valve,
such that when there is an abnormality, the depressing force cut-off valve opens to provide communication between the master cylinder and the wheel cylinder, the reaction force permitting valve closes so as to cut off communication between the master cylinder and the stroke simulator, and the atmosphere valve closes so as to cut off communication between the master cylinder and the reservoir.

16. A depressing force cut-off valve for a brake system, comprising:
a solenoid;
a hollow cylindrical housing having an interior space defined therein;
a valve body disposed within the interior space of the housing, the valve body configured and arranged to be slidably positioned within the housing by operation of the solenoid;
a front chamber formed within the housing and configured to communicate with a master cylinder of the brake system;
a rear chamber formed within the housing configured to communicate with a braking force generating device of the brake system; and
a valve seat disposed between the front chamber and the rear chamber, the valve seat configured to permit fluid communication between the front and rear chambers when the solenoid is de-energized and the valve body is disposed at a location spaced apart from the valve seat, and configured to block fluid communication between the front and rear chambers when the solenoid is energized and the valve body is in contact with the valve seat;

wherein the solenoid can be in an energized state, a partially energized state, or a de-energized state;

and wherein the rear chamber is always maintained at a low pressure that is close to atmospheric pressure while the depressing force cut-off valve is closed, and the front chamber is maintained at a pressure which is atmospheric or greater.

17. The depressing force cut-off valve according to claim 16, wherein the depressing force cut-off valve is closed by energizing a solenoid during normal operation of a braking force generating device, and opened by de-energizing the solenoid when an abnormality with the braking force generating device occurs.

* * * * *